(12) United States Patent
Chang et al.

(10) Patent No.: US 9,037,936 B2
(45) Date of Patent: May 19, 2015

(54) APPARATUS AND METHOD FOR GENERATING MAC PROTOCOL DATA UNIT IN WIRELESS COMMUNICATION SYSTEM

(75) Inventors: Young-Bin Chang, Anyang-si (KR); Rakesh Taori, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 610 days.

(21) Appl. No.: 12/978,964

(22) Filed: Dec. 27, 2010

(65) Prior Publication Data

US 2011/0161768 A1   Jun. 30, 2011

(30) Foreign Application Priority Data

Dec. 30, 2009   (KR) .................. 10-2009-0134253
Jan. 13, 2010   (KR) .................. 10-2010-0002961

(51) Int. Cl.
*G06F 11/00* (2006.01)
*H04L 1/18* (2006.01)

(52) U.S. Cl.
CPC ............ *H04L 1/1874* (2013.01); *H04L 1/1893* (2013.01); *H04L 1/1887* (2013.01)

(58) Field of Classification Search
CPC .......... H03M 13/6306; H03M 13/116; H03M 13/1185; H03M 13/255; H03M 13/2957; H03M 13/356; H03M 13/618; H03M 13/6393; H03M 13/6505; H03M 13/6525; H03M 13/6558; H03M 13/6566; H04W 24/02
USPC .................................. 714/748, 749
See application file for complete search history.

(56) References Cited

U.S. PATENT DOCUMENTS 6,519,223 B1   2/2003   Wager et al.
7,020,822 B2*  3/2006   Ho et al. ................. 714/748
(Continued)

FOREIGN PATENT DOCUMENTS

CN   101222304 A   7/2008
EP   1 892 874 A2   8/2007
(Continued)

OTHER PUBLICATIONS 806.16.2004, Part 16: Air Interface for Fixed Broadband Wireless Access Systems, IEEE Standard For Local And Metropolitan Area Networks, Jan. 1, 2004, pp. 128-138, no. Part. 16.

*Primary Examiner* — Bryce Bonzo
*Assistant Examiner* — Elmira Mehrmanesh
(74) *Attorney, Agent, or Firm* — Jefferson IP Law, LLP

(57) ABSTRACT

An apparatus and a method for transmitting an Automatic Repeat reQuest (ARQ) block in a wireless communication system are provided. The method for transmitting the ARQ block includes when transmitting the ARQ block to a receiving stage in a Not Sent state, transitioning to an Outstanding state to wait to receive one of an ACK and a NACK for the ARQ block, when receiving the NACK for the ARQ block from the receiving stage in the Outstanding state, transitioning to a Waiting for Retransmission state, when determining to retransmit the ARQ block for the NACK by splitting the ARQ block into at least two ARQ sub-blocks in the Waiting for Retransmission state, transitioning to a Rearrangement state, retransmitting the ARQ block for the NACK by splitting the ARQ block into at least two ARQ sub-blocks in the Rearrangement state, and when receiving an ACK for every ARQ sub-block having the same ARQ Sequence Number (SN) in the Rearrangement state, transitioning to a Done state and finishing transmission of the ARQ block having the ARQ SN.

14 Claims, 5 Drawing Sheets

(56) References Cited

U.S. PATENT DOCUMENTS

| | | | |
|---|---|---|---|
| 8,201,044 B2 * | 6/2012 | Chang et al. | 714/749 |
| 8,311,029 B2 * | 11/2012 | Chang et al. | 370/349 |
| 8,397,119 B2 * | 3/2013 | Chang et al. | 714/749 |
| 8,516,334 B2 * | 8/2013 | Xu et al. | 714/758 |
| 2005/0042985 A1 | 2/2005 | Cheng et al. | |
| 2005/0122898 A1 | 6/2005 | Jang et al. | |
| 2006/0150050 A1 * | 7/2006 | Choi et al. | 714/748 |
| 2007/0214399 A1 | 9/2007 | Lim et al. | |
| 2007/0245201 A1 * | 10/2007 | Sammour et al. | 714/748 |
| 2007/0245204 A1 * | 10/2007 | Yomo et al. | 714/749 |
| 2007/0288824 A1 | 12/2007 | Yeo et al. | |
| 2008/0052589 A1 * | 2/2008 | Shinohara et al. | 714/748 |
| 2008/0195911 A1 | 8/2008 | Schaap et al. | |
| 2009/0049356 A1 * | 2/2009 | Lin | 714/749 |
| 2009/0116420 A1 | 5/2009 | Jeong et al. | |
| 2009/0150737 A1 * | 6/2009 | Wang et al. | 714/748 |
| 2010/0027460 A1 * | 2/2010 | Kim et al. | 370/315 |
| 2010/0290400 A1 | 11/2010 | Lee et al. | |

FOREIGN PATENT DOCUMENTS

| | | |
|---|---|---|
| EP | 2 012 457 A2 | 7/2008 |
| JP | 11-32077 A | 2/1999 |
| JP | 11-98128 A | 4/1999 |
| JP | 2002-541727 A | 12/2002 |
| JP | 2007-517458 A | 6/2007 |
| JP | 2007-221795 A | 8/2007 |
| JP | 2009-536468 A | 10/2009 |
| KR | 10-2007-0113686 A | 11/2007 |

* cited by examiner

US 9,037,936 B2

APPARATUS AND METHOD FOR GENERATING MAC PROTOCOL DATA UNIT IN WIRELESS COMMUNICATION SYSTEM

PRIORITY

The present application claims the benefit under 35 U.S.C. §119(a) of a Korean patent application filed in the Korean Intellectual Property Office on Dec. 30, 2009, and assigned Serial No. 10-2009-0134253, a Korean patent application filed in the Korean Intellectual Property Office on Jan. 13, 2010, and assigned Serial No. 10-2010-0002961, the entire disclosure of each of which is hereby incorporated by reference.

BACKGROUND OF THE INVENTION

1. Field of the Invention

The present invention relates generally to an apparatus and a method for supporting Automatic Repeat reQuest (ARQ) in a wireless communication system. More particularly, the present invention relates to an apparatus and a method for supporting ARQ for an ARQ block or an ARQ sub-block in the wireless communication system.

2. Description of the Related Art

A wireless communication system is subject to data error according to a channel condition of a radio resource carrying the data. To raise transmission reliability, the wireless communication system controls and recovers from the data error using an Automatic Repeat reQuest (ARQ) scheme.

Using the ARQ scheme, a receiving stage informs a transmitter stage of reception success or failure of an ARQ block received from the transmitting stage. For example, when the ARQ block received from the transmitting stage has no error, the receiving stage sends ACKnowledge (ACK) information to the transmitting stage. Conversely, when the ARQ block received from the transmitting stage is erroneous, the receiving stage sends Negative ACK (NACK) information to the transmitting stage. Herein, a series of the operations of the receiving stage which informs the transmitting stage of the success or failure of the packet reception is referred to as ARQ feedback.

Upon confirming the packet successfully received at the receiving stage based on the ARQ feedback, the transmitting stage sends a new packet.

When confirming the packet failed to arrive at the receiving stage based on the ARQ feedback, the transmitting stage retransmits the failed packet to the receiving stage. In so doing, the transmitting stage can recognize that the receiving stage fails to receive the packet due to the poor channel condition of the receiving stage. In this regard, the transmitting stage requires a technique for retransmitting the packet by taking account of the channel condition.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for supporting Automatic Repeat reQuest (ARQ) for Media Access Control (MAC) Protocol Data Unit (MPDU) to control error in a wireless communication system.

Another aspect of the present invention is to provide an apparatus and a method for supporting ARQ for an MPDU to retransmit at a transmitting stage in a wireless communication system.

Yet another aspect of the present invention is to provide an apparatus and a method for supporting ARQ by dividing an ARQ block into at least two ARQ sub-blocks when a transmitting stage retransmits the ARQ block in a wireless communication system.

In accordance with an aspect of the present invention, a method for transmitting an ARQ block in a wireless communication system includes when transmitting the ARQ block to a receiving stage in a Not Sent state, transitioning to an Outstanding state to wait to receive one of an ACK and a NACK for the ARQ block, when receiving the NACK for the ARQ block from the receiving stage in the Outstanding state, transitioning to a Waiting for Retransmission state; when determining to retransmit the ARQ block for the NACK by splitting the ARQ block into at least two ARQ sub-blocks in the Waiting for Retransmission state, transitioning to a Rearrangement state, retransmitting the ARQ block for the NACK by splitting the ARQ block into at least two ARQ sub-blocks in the Rearrangement state, and when receiving an ACK for every ARQ sub-block having the same ARQ Sequence Number (SN) in the Rearrangement state, transitioning to a Done state and finishing transmission of the ARQ block having the ARQ SN.

In accordance with another aspect of the present invention, an apparatus for transmitting an ARQ block in a wireless communication system includes a transmitter for transmitting the ARQ block to a receiving stage in a Not Sent state, a receiver for, when the transmitter transmits the ARQ block to the receiving stage in the Not Sent state, transitioning to an Outstanding state and receiving one of an ACK and a NACK for the ARQ block, a controller for, when the receiver receives the NACK for the ARQ block from the receiving stage in the Outstanding state, transitioning to a Waiting for Retransmission state and for controlling to retransmit the ARQ block for the NACK by splitting the ARQ block into at least two ARQ sub-blocks, and a retransmit block generator for splitting the ARQ block for the NACK into at least two ARQ sub-blocks in a Rearrangement state under control of the controller. The transmitter transmits the at least two ARQ sub-blocks divided by the retransmit block generator, to the receiving stage in the Rearrangement state, and when receiving ACK for every ARQ sub-block having the same ARQ SN via the receiver in the Rearrangement state, the controller transitions to a Done state and finishes transmission of the ARQ block having the ARQ SN.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a technique for supporting Automatic Repeat reQuest (ARQ) for an ARQ block or an ARQ sub-block in a wireless communication system.

Hereinafter, a transmitting stage and a receiving stage embrace all of transmitting and receiving nodes, such as base station controller, base station, relay station, and mobile station, constituting a wireless communication system.

It is assumed that the transmitting stage sets one Media Access Control (MAC) Protocol Data Unit (MPDU) to one ARQ block for error control of the MAC layer. Hence, the transmitting stage uses a Sequence Number (SN) allocated to each MPDU, such as an ARQ SN.

The transmitting stage generates the ARQ block for the ARQ as shown in FIG. 1. In so doing, the transmitting stage defines a MPDU generated by decomposing and assembling MAC Service Data Units (MSDUs) according to scheduling information of the MAC layer, as the ARQ block.

FIGS. 1A, 1B, 1C and 1D illustrate the MPDU to retransmit in the wireless communication system according to an exemplary embodiment of the present invention.

Figure 1A:
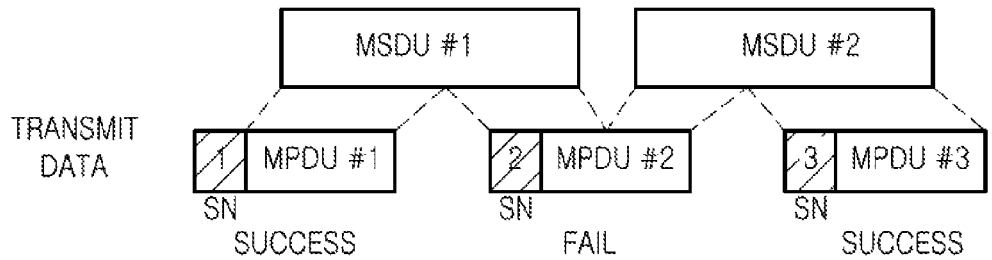
FIGS. 1A, 1B, 1C and 1D illustrate an ARQ block and an Automatic Repeat reQuest (ARQ) retransmit block in a wireless communication system according to an exemplary embodiment of the present invention.
Figure 1B:
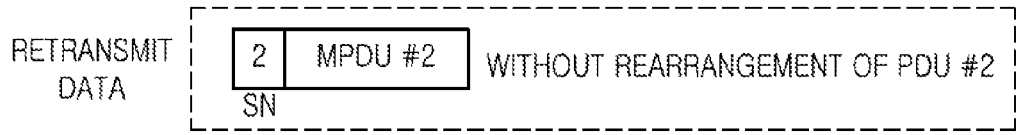
Figure 1C:
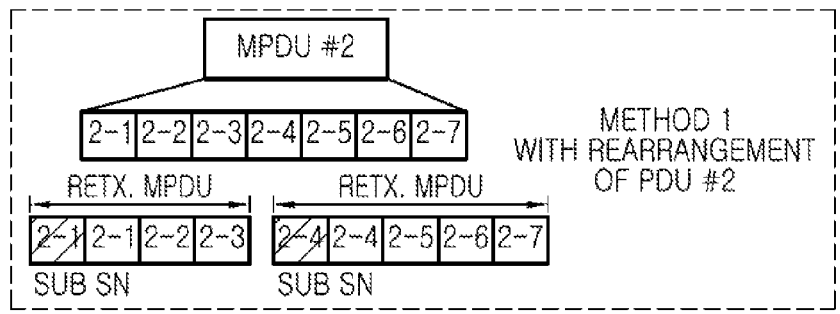
Figure 1D:
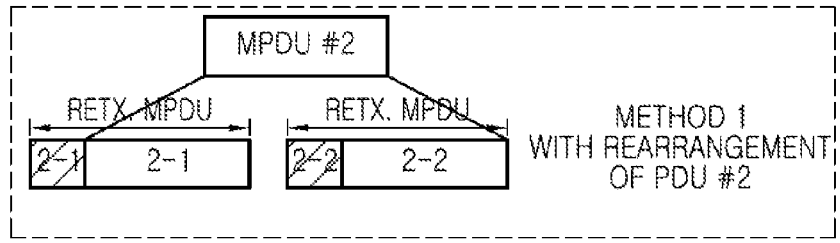

FIG. 1A shows the transmit data, and FIGS. 1B, 1C and 1D show the retransmit data.

When the MAC layer of the transmitting stage receives two MSDUs (i.e., MSDU #1 and MSDU #2) from one connector of its upper layer as shown in FIG. 1A, the transmitting stage generates data for three MPDUs (MPDU #1, MPDU #2, and MPDU #3) by restructuring the MSDUs according to the scheduling information of the MAC layer. For example, the transmitting stage sets the SN of the MPDU #1, MPDU #2, and MPDU #3 to 1, 2 and 3, respectively.

Next, the transmitting stage generates the MPDU by adding a Fragmentation and Packing Indicator (FPI) and a General MAC Header (GMH) to the data of the MPDU. Herein, the FPI includes MSDU information constituting the data of the MPDU and the SN of the MPDU.

When the MPDU #2 of the MPDUs transmitted by the transmitting stage is compromised, the receiving stage requests the transmitting stage to retransmit the MPDU #2 using ARQ feedback.

The transmitting stage can retransmit the original MPDU to the receiving stage, or split and retransmit the erroneous MPDU to the receiving stage as shown in FIGS. 1B, 1C and 1D.

To retransmit the erroneous MPDU #2, the transmitting stage can retransmit the original MPDU of the MPDU #2 to the receiving stage as shown in FIG. 1B. That is, the transmitting stage can retransmit to the receiving stage the MPDU constituted as in the initial MPDU #2 transmission.

To retransmit the erroneous MPDU #2, the transmitting stage can split the MPDU #2 into at least two ARQ sub-blocks of the fixed length as shown in FIG. 1C. For example, the transmitting stage divides the MPDU #2 into seven ARQ sub-blocks of the fixed length (i.e., sub-block 2-1, sub-block 2-2, sub-block 2-3, sub-block 2-4, sub-block 2-5, sub-block 2-6 and sub-block 2-7). Next, the transmitting stage generates one retransmit MPDU data with three ARQ sub-blocks (i.e., sub-block 2-1, sub-block 2-2, sub-block 2-3) and generates another retransmit MPDU data with the other four ARQ sub-blocks (i.e., sub-block 2-4, sub-block 2-5, sub-block 2-6 and sub-block 2-7). In so doing, the transmitting stage can assign an ARQ sub-SN including the SN of the MPDU #2 to each ARQ sub-block. Namely, the ARQ sub-SN includes the ARQ SN.

To retransmit the erroneous MPDU #2, the transmitting stage can split the MPDU #2 into at least two ARQ sub-blocks of the variable length (i.e., sub-block 2-1 and sub-block 2-2) as shown in FIG. 1D. For example, the transmitting stage divides the MPDU #2 into two ARQ sub-blocks of the variable length. The transmitting stage generates one retransmit MPDU with one ARQ sub-block and assigns the SN to each retransmit MPDU. For example, the transmitting stage assigns the ARQ sub-SN 2-1 including the ARQ SN 2 to the first ARQ sub-block, and assigns the ARQ sub-SN 2-2 including the ARQ SN 2 to the second ARQ sub-block.

Figure 2:
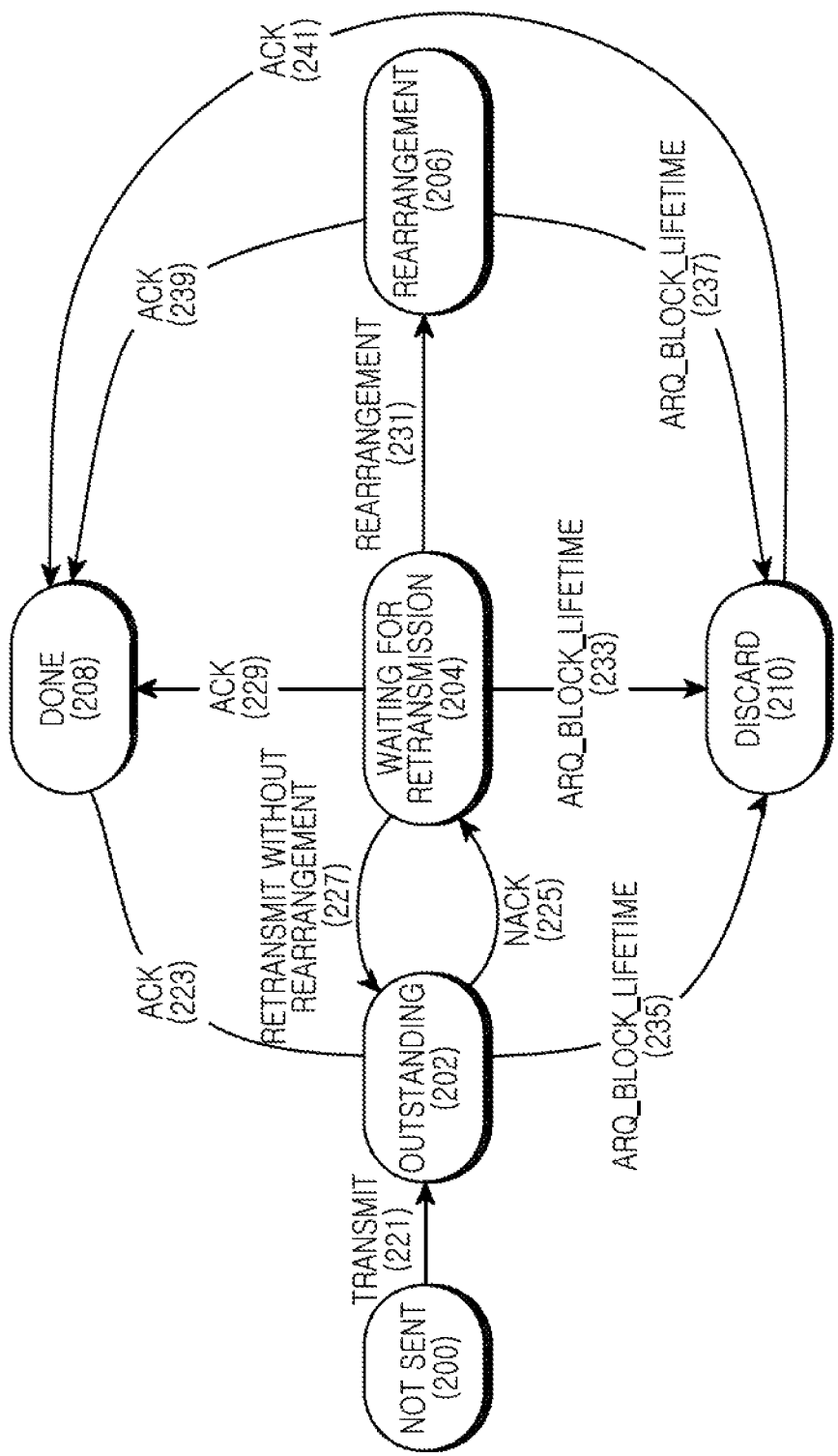
FIG. 2 illustrates ARQ block state transition according to an exemplary embodiment of the present invention.

The ARQ block generated at the transmitting stage as above transitions according to the ARQ as shown in FIG. 2.

FIG. 2 is a diagram of ARQ block state transition according to an exemplary embodiment of the present invention.

The state of the ARQ block includes Not Sent 200, Outstanding 202, Waiting for Retransmission 204, Rearrangement 206, Done 208, and Discard 210 as shown in FIG. 2.

The Not Sent state 200 is the state before the transmitting stage sends the ARQ block to the receiving stage.

When the transmitting stage transmits the ARQ block to the receiving stage in the Not Sent state 200 in step 221, the ARQ block transitions to the Outstanding state 202. In the Outstanding state 202, the transmitting stage waits to receive one of an ACK and a NACK for the ARQ block from the receiving stage.

When the transmitting stage receives the ACK for the ARQ block from the receiving stage in the Outstanding state 202 of the ARQ block in step 223, the ARQ block transitions to the Done state 208. In the Done state 208, the transmitting stage finishes the ARQ block transmission with respect to the ACK. In so doing, a life timer of the ARQ block (i.e., ARQ_BLOCK_LIFE_TIMEOUT) ends. That is, the transmitting stage stops the life timer of the ARQ block for the ACK.

When the lifetime of the ARQ block expires in the Outstanding state 202 of the ARQ block in step 235, the ARQ block transitions to the Discard state 210. In the Discard state 210, the transmitting stage discards the ARQ block.

When the transmitting stage receives the NACK for the ARQ block from the receiving stage in the Outstanding state 202 of the ARQ block in step 225, the ARQ block transitions to the Waiting for Retransmission state 204. In the Waiting for Retransmission state 204, the transmitting stage waits to retransmit the ARQ block in response to the NACK.

When the lifetime of the ARQ block expires in the Waiting for Retransmission state 204 of the ARQ block in step 233, the ARQ block transitions to the Discard state 210. In the Discard state 210, the transmitting stage discards the ARQ block.

When the transmitting stage receives the ACK for the ARQ block from the receiving stage in the Waiting for Retransmission state 204 of the ARQ block in step 229, the ARQ block transitions to the Done state 208. In the Done state 208, the transmitting stage finishes the ARQ block transmission. In so doing, the life timer of the ARQ block ends.

When the transmitting stage retransmits the ARQ block to the receiving stage in response to the NACK without splitting the ARQ block into the ARQ sub-blocks in the Waiting for Retransmission state 204 of the ARQ block in step 227, the ARQ block transitions to the Outstanding state 202. In the Outstanding state 202, the transmitting stage waits to receive one of an ACK and an NACK for the retransmitted ARQ block.

When the transmitting stage determines to retransmit the ARQ block in response to the NACK by splitting the ARQ block into at least two ARQ sub-blocks in the Waiting for Retransmission state 204 of the ARQ block in step 231, the ARQ block transitions to the Rearrangement state 206. In the Rearrangement state 206, the transmitting stage retransmits the ARQ block by splitting the ARQ block into at least two ARQ sub-blocks.

Upon receiving NACK for the ARQ sub-block from the receiving stage in the Rearrangement state 206 of the ARQ block, the transmitting stage retransmits the ARQ sub-block in response to the NACK.

Upon receiving ACK for the ARQ sub-block from the receiving stage in the Rearrangement state 206 of the ARQ block, the transmitting stage determines whether an ACK is received with respect to every ARQ sub-block having the same ARQ SN as the ARQ sub-block of the ACK. When the ACK is received with respect to every ARQ sub-block having the same ARQ SN in the Rearrangement state 206 of the ARQ block in step 239, the ARQ block transitions to the Done state 208. In the Done state 208, the transmitting stage finishes the ARQ block transmission in response to the ACK. In so doing, the life timer of the ARQ block ends.

When the lifetime of the ARQ block including the ARQ sub-blocks expires in the Rearrangement state 206 of the ARQ block in step 237, the ARQ block transitions to the Discard state 210. In the Discard state 210, the transmitting stage discards the ARQ block.

When the transmitting stage receives the ACK of the ARQ block from the receiving stage in the Discard state 210 in step 241, the ARQ block transitions to the Done state 208. In the Done state 208, the transmitting stage finishes the ARQ block transmission. This operation is conducted only when the transmitting stage receives the ACK of the ARQ block from the receiving stage in the Discard state 210.

In this exemplary embodiment, upon determining to retransmit the ARQ block by dividing the ARQ block into the ARQ sub-blocks, the transmitting stage retransmits the ARQ block by dividing the ARQ block into the ARQ sub-blocks in the Rearrangement state 206.

Alternatively, upon determining to retransmit the ARQ block by dividing the ARQ block into the ARQ sub-blocks, the transmitting stage may retransmit the ARQ block by dividing the ARQ block into the ARQ sub-blocks in the Waiting for Retransmission state 204. In this case, the transmitting stage processes the ARQ of the ARQ sub-block sent to the receiving stage in the Rearrangement state 206.

Figure 3:
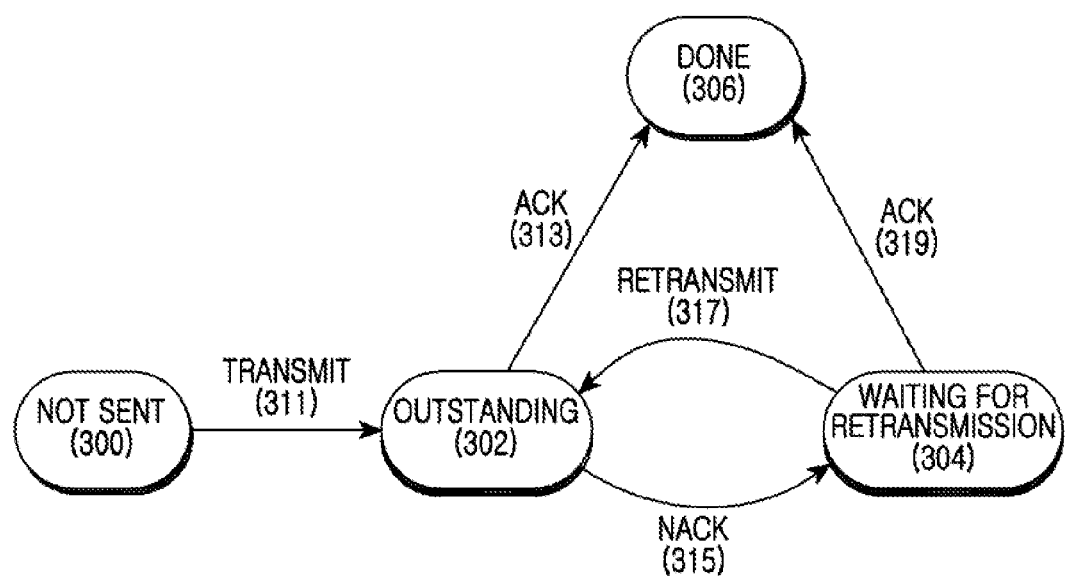
FIG. 3 illustrates ARQ sub-block state transition according to an exemplary embodiment of the present invention.

FIG. 3 illustrates ARQ sub-block state transition according to an exemplary embodiment of the present invention. Hereafter, the states of the ARQ sub-block are described when the ARQ block is divided into the ARQ sub-blocks for the retransmission in the Rearrangement state 206 of FIG. 2.

The states of the ARQ sub-block include Not Sent 300, Outstanding 302, Waiting for Retransmission 304, and Done 306 as shown in FIG. 3.

When the ARQ block to retransmit is divided into the ARQ sub-blocks, the ARQ block is divided into at least two ARQ sub-blocks in the Not Sent state 300 and the SN is allocated to each ARQ sub-block.

When the transmitting stage transmits the ARQ sub-blocks to the receiving stage in the Not Sent state 300 in step 311, the ARQ sub-block transitions to the Outstanding state 302. In the Outstanding state 302, the transmitting stage waits to receive one of an ACK and a NACK for the ARQ sub-block from the receiving stage.

When the transmitting stage receives the ACK for the ARQ sub-block from the receiving stage in the Outstanding state 302 of the ARQ sub-block in step 313, the ARQ sub-block transitions to the Done state 306. In the Done state 306, the transmitting stage completes the ARQ sub-block transmission with respect to the ACK.

When the transmitting stage receives the NACK for the ARQ sub-block from the receiving stage in the Outstanding state 302 of the ARQ sub-block in step 315, the ARQ sub-block transitions to the Waiting for Retransmission state 304. In the Waiting for Retransmission state 304, the transmitting stage waits to retransmit the ARQ sub-block in response to the NACK.

When the transmitting stage receives the ACK for the ARQ sub-block from the receiving stage in the Waiting for Retransmission state 304 of the ARQ sub-block in step 319, the ARQ sub-block transitions to the Done state 306. In the Done state 306, the transmitting stage finishes the ARQ sub-block transmission.

When the transmitting stage retransmits the ARQ sub-block in the Waiting for Retransmission state 304 of the ARQ sub-block in step 317, the ARQ sub-block transitions to the Outstanding state 302. In the Outstanding state 302, the transmitting stage waits to receive one of an ACK and a NACK for the ARQ sub-block from the receiving stage.

Figure 4:
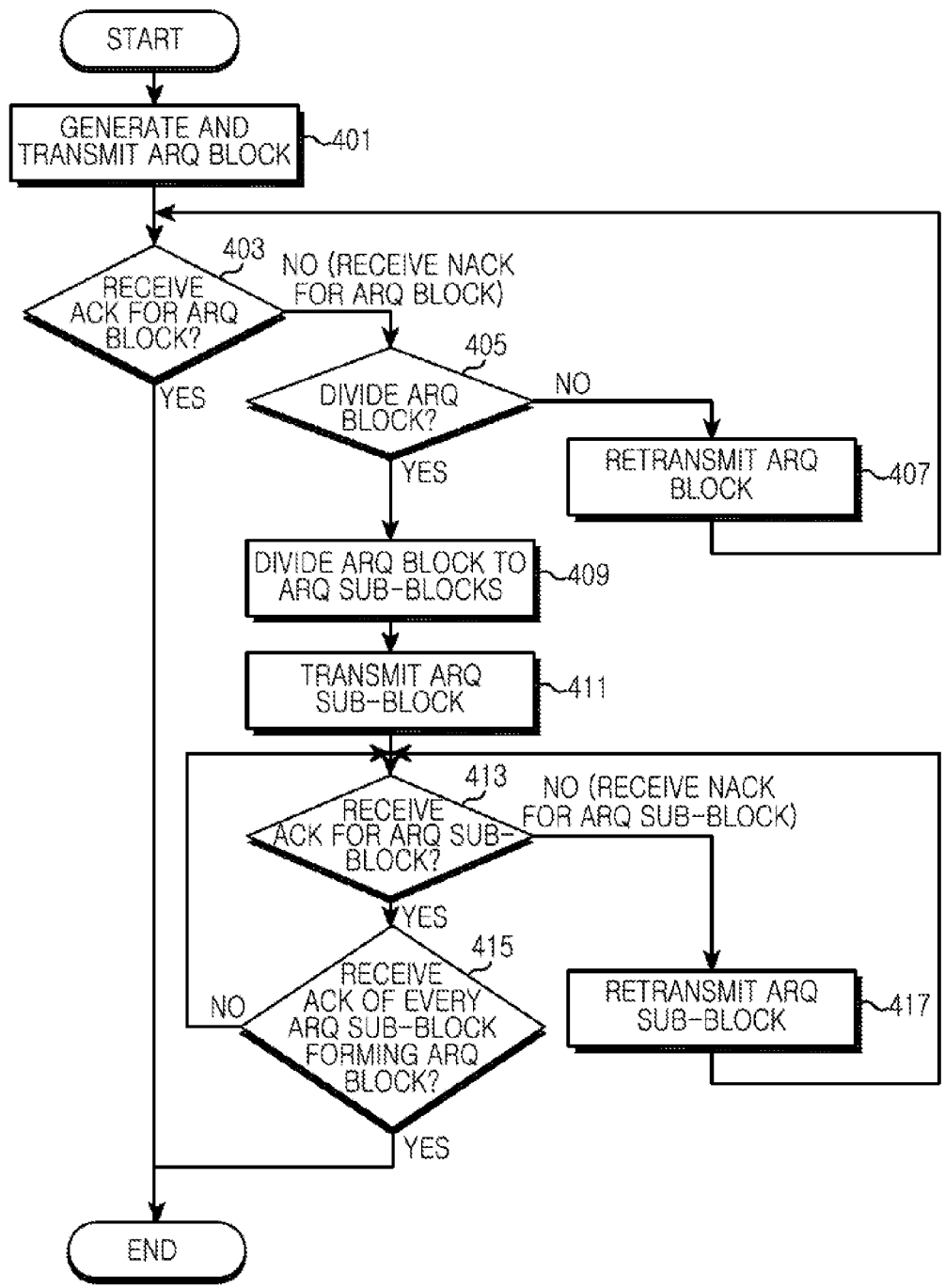
FIG. 4 illustrates a method for retransmitting the ARQ block at a transmitting stage in a wireless communication system according to an exemplary embodiment of the present invention.

FIG. 4 illustrates a method for retransmitting the ARQ block at a transmitting stage in a wireless communication system according to an exemplary embodiment of the present invention.

In step 401, the transmitting stage generates and transmits the ARQ block to the receiving stage. For example, the transmitting stage defines the MPDU generated by decomposing and assembling at least one MSDU provided from one connector of the upper layer, as the ARQ block.

In step 403, the transmitting stage determines whether an ACK for the transmitted ARQ block is received from the receiving stage.

When receiving the ACK for the ARQ block from the receiving stage, the transmitting stage recognizes the successful transmission of the ARQ block based on the ACK. Thus, the transmitting stage finishes this process.

Meanwhile, when receiving a NACK for the ARQ block from the receiving stage in step 403, the transmitting stage recognizes based on the NACK that the ARQ block is compromised. Hence, the transmitting stage determines whether to retransmit the ARQ block for the NACK by splitting the ARQ block into ARQ sub-blocks in step 405. For example, the transmitting stage determines whether to divide the ARQ block to retransmit into the ARQ sub-blocks according to a radio resource operation plan of a scheduler. To transmit the ARQ block more robustly against a radio channel than the initial transmission, the transmitting stage determines to divide the ARQ block to retransmit into the ARQ sub-blocks.

When determining not to divide the ARQ block in response to the NACK in step 405, the transmitting stage retransmits the ARQ block to the receiving stage for the NACK in step 407. For example, the transmitting stage generates the same data of the retransmit MPDU as the data of the original MPUD, and generates and retransmits the same FPI and GMH of the retransmit MPDU as the FPI and the GMH of the original MPDU.

In contrast, when determining to divide the ARQ block in response to the NACK in step 405, the transmitting stage splits the ARQ block to retransmit into at least two ARQ sub-blocks in step 409. For example, the transmitting stage may divide the ARQ block into the ARQ sub-blocks of the fixed length as shown in FIG. 1C. For another example, the transmitting stage may divide the ARQ block into the ARQ sub-blocks of the variable length as shown in FIG. 1D.

In step 411, the transmitting stage retransmits the ARQ sub-blocks to the receiving stage. For example, the transmitting stage generates and transmits the retransmit MPDU including at least one of the ARQ sub-blocks to the receiving stage. At this time, the information of the FPI and the GMH of the retransmit MPDU is different from the original MPDU. For example, the FPI of the retransmit MPDU is Rearrangement FPI (RFPI) including the ARQ SN, the ARQ sub-SN, and LAST Sub-block Sequence Indicator (LSI) information that indicates whether the last ARQ sub-SN is included. Herein, the information of the upper SDU included in the RFPI can also differ from the initial transmission.

In step 413, the transmitting stage determines whether an ACK for the ARQ sub-block is received from the receiving stage.

When receiving the ACK for the ARQ sub-block, the transmitting stage determines whether the ACK for every ARQ sub-block of the same ARQ SN as the ARQ sub-block of the ACK is received in step 415. For example, when the ARQ sub-block for the ACK belongs to the ARQ block of the SN #2, the transmitting stage determines whether the ACK is received for every ARQ sub-block divided from the ARQ block of the SN #2.

If the ACK is not received for every ARQ sub-block of the same ARQ block SN as the ARQ sub-block of the ACK, the transmitting stage determines whether an ACK for the ARQ sub-block is received from the receiving stage in step 413.

Meanwhile, when receiving the ACK for every ARQ sub-block of the same ARQ SN as the ARQ sub-block of the ACK, the transmitting stage recognizes that the ARQ block including the ARQ sub-block of the ACK is successfully transmitted. Thus, the transmitting stage finishes this process.

When receiving the NACK for the ARQ sub-block from the receiving stage in step 413, the transmitting stage retransmits the ARQ sub-block to the receiving stage in response to the NACK in step 417.

Next, the transmitting stage determines whether an ACK for the ARQ sub-block is received from the receiving stage in step 413.

Although it is not illustrated here, when the lifetime for the ARQ block expires, the transmitting stage recognizes that the ARQ block transmission fails. Hence, the transmitting stage discards the corresponding ARQ block. As retransmitting the ARQ sub-block, the transmitting stage can determine the success or the failure of the ARQ block transmission by taking account of the lifetime of the ARQ block including the ARQ sub-block.

In this exemplary embodiment, when the ARQ sub-block is compromised, the transmitting stage retransmits the ARQ sub-block without splitting it.

Alternatively, when the ARQ sub-block is compromised, the transmitting stage may retransmit the ARQ sub-block by subdividing the ARQ sub-block.

In this exemplary embodiment, when retransmitting the ARQ sub-block, the transmitting stage determines the transmission success or the lifetime expiration on the ARQ block basis.

Alternatively, the transmitting stage may determine the transmission success or the lifetime expiration on the ARQ sub-block basis. That is, when the receiving stage can restore one MSDU with the ARQ sub-block, the transmitting stage may be able to determine the transmission success or the lifetime expiration on the ARQ sub-block basis.

In this exemplary embodiment, upon receiving the NACK for the ARQ block, the transmitting stage recognizes that the ARQ block is compromised based on the NACK.

Alternatively, if no one of an ACK and a NACK is received for the ARQ block for a certain time after the ARQ block is transmitted, the transmitting stage recognizes that the ARQ block is compromised. In this case, the transmitting stage determines whether to retransmit the ARQ block in response to the NACK by splitting the ARQ block into the ARQ sub-blocks in step 405.

Now, a structure of the transmitting stage for retransmitting the ARQ block is explained.

Figure 5:
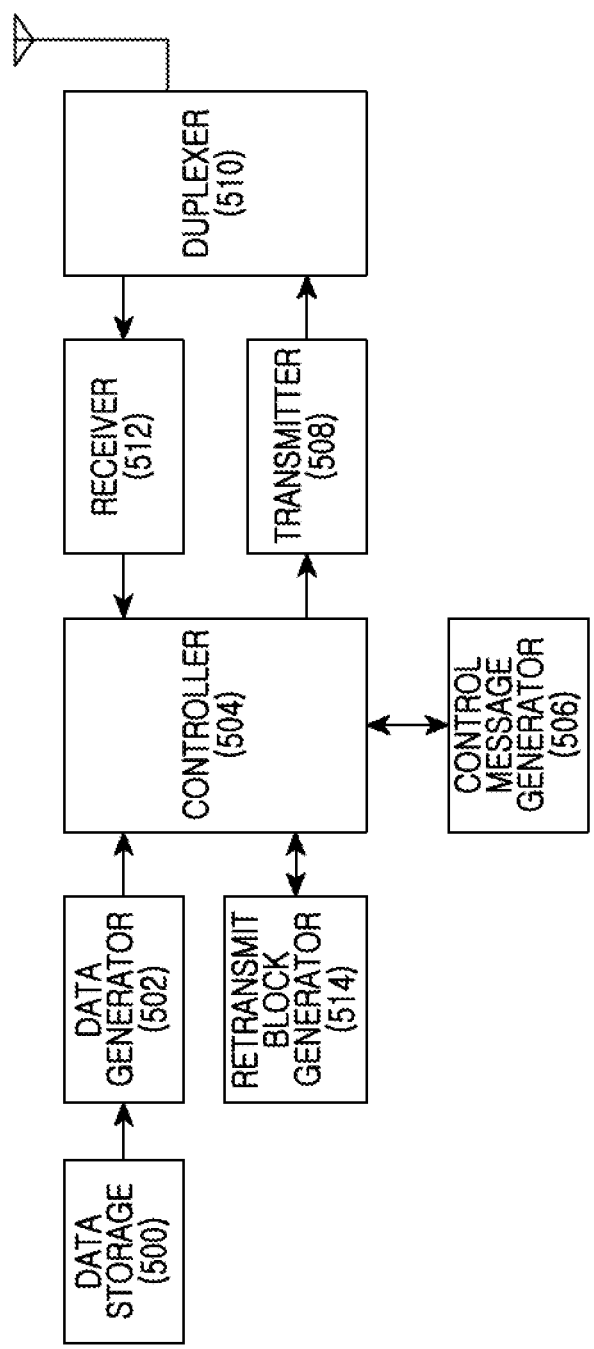
FIG. 5 illustrates the transmitting stage in a wireless communication system according to an exemplary embodiment of the present invention.

FIG. 5 illustrates a transmitting stage in a wireless communication system according to an exemplary embodiment of the present invention.

The transmitting stage of FIG. 5 includes a data storage 500, a data generator 502, a controller 504, a control message generator 506, a transmitter 508, a duplexer 510, a receiver 512, and a retransmit block generator 514.

The data storage 500 stores data generated in an upper application program. That is, the data storage 500 stores the MSDU provided from the upper application program. Herein, the data storage 500 is constructed as a data queue.

The data generator 502 generates the data of the MPDU by decomposing and assembling the MSDUs stored in the data storage 500 according to the resource scheduling information of the MAC layer. For example, the data generator 502 may generate the data of the MPDU by splitting the MSDU provided from the upper layer according to the resource scheduling information of the MAC layer, or by combining one or more MSDUs or part of the MSDU as shown in FIG. 1A.

The controller 504 controls the signal transmission and reception and the ARQ of the transmitting stage. The controller 504 assigns the SN to the data of the MPDUs generated at the data generator 502 in sequence. The SN assigned to the data of the MPDU is used as the ARQ SN.

The controller 504 generates the MPDU by adding the FPI and the GMH provided from the control message generator 506 to the data of the MPDU provided from the data generator 502. Next, the controller 504 generates and provides a physical layer PDU including one or more MPDUs to the transmitter 508. One MPDU is set to one ARQ block.

Based on the ARQ feedback information received from the receiving stage, the controller 504 checks the error information of the ARQ blocks sent to the receiving stage. Next, the controller 504 controls to retransmit the ARQ blocks according to the error information. The controller 504 controls to retransmit the original ARQ block of the erroneous ARQ block, or to retransmit the ARQ block by dividing the ARQ block into at least two ARQ sub-blocks.

To retransmit the ARQ block by dividing the ARQ block into the ARQ sub-blocks, the controller 504 controls to perform the ARQ on the ARQ sub-block basis. For example, upon receiving the NACK for the ARQ sub-block, the controller 504 controls to retransmit the ARQ sub-block. For example, upon receiving the NACK for the ARQ sub-block, the controller 504 may control to retransmit the ARQ sub-block by sub-dividing the ARQ sub-block for the NACK.

To retransmit the ARQ block by splitting the ARQ block into the ARQ sub-blocks, the controller 504 determines whether the transmission is successful on the ARQ block basis. For example, when receiving the ACK for the ARQ sub-block, the controller 504 determines whether an ACK is received with respect to every ARQ sub-block having the same ARQ block SN as the ARQ sub-block. Receiving the ACK with respect to every ARQ sub-block having the same ARQ block SN as the ARQ sub-block of the ACK, the controller 504 recognizes that the ARQ block including the ARQ sub-block for the ACK is successfully transmitted.

When transmitting the ARQ block or the ARQ sub-block, the controller 504 examines whether the transmission fails by considering the lifetime of the ARQ block.

The retransmit block generator 514 splits the data of the MPDU to retransmit into the ARQ sub-blocks under the control of the controller 504. For example, the retransmit block generator 514 splits the data of the MPDU into the ARQ sub-blocks of the fixed length as shown in FIG. 1C. In so doing, the retransmit block generator 514 generates the data of one or more retransmit MPDUs to include one or more ARQ sub-blocks. For example, the retransmit block generator 514 may split the data of the MPDU into the ARQ sub-blocks of the variable length as shown in FIG. 1D. In so doing, the retransmit block generator 514 defines one ARQ sub-block as one retransmit MPDU.

The control message generator 506 generates the GMH including the connection identifier information and the length information of the MPDU, and FPI including the MSDU information constituting the data of the MPDU under the control of the controller 504. When the erroneous MPDU is retransmitted under the control of the controller 504, the control message generator 506 generates the RFPI including the MSDU information constituting the data of the retransmit MPDU, and the GMH including the length information of the retransmit MPDU and the connection identifier information.

When the retransmit block generator 514 splits the data of the MPDU into the ARQ sub-blocks of the fixed length, the control message generator 506 constitutes the RFPI to include the earliest ARN sub-SN among the ARQ sub-blocks constituting the data of the retransmit MPDU.

The transmitter 508 includes a channel coding block, a modulating block, and a Radio Frequency (RF) processing block. The transmitter 508 converts the physical layer PDUs provided from the ARQ controller 504 to an RF signal and transmits the RF signal to the receiving stage via the duplexer 510. For example, the channel coding block includes a channel coder, an interleaver, a modulator, and so on. The modulating block includes an Inverse Fast Fourier Transform (IFFT) operator in an Orthogonal Frequency Division Multiplexing (OFDM) scheme, and includes a code spreading modulator in a Code Division Multiple Access (CDMA) system. The RF processing block converts the baseband signal output from the modulating block to an RF signal and outputs the RF signal over an antenna.

The duplexer 510 sends the transmit signal output from the transmitter 508 over an antenna, and provides a receive signal from the antenna to the receiver 512 according to the duplexing scheme.

The receiver 512 includes an RF processing block, a demodulating block, a channel decoding block, and so on. The receiver 512 demodulates the RF signal fed from the duplexer 510 to the baseband signal. For example, the RF processing block converts the RF signal output from the duplexer 510 to the baseband signal. The demodulating block includes an FFT operator for extracting data from subcarriers of the signal output from the RF processing block. The channel decoding block includes a demodulator, a deinterleaver, and a channel decoder.

As constructed above, the controller 504 can function as the control message generator 506 and the retransmit block generator 514. Here, they are separately provided to distinguish their functions. Accordingly, in the implementation, the controller 504 can process all or part of the functions of the control message generator 506 and the retransmit block generator 514.

As set forth above, the transmitting stage of the wireless communication system supports the ARQ of the ARQ block by dividing the retransmit ARQ block into at least two ARQ sub-blocks. Therefore, it is possible to reduce the resources wasted because of the size of the MPDU in the physical layer, and to raise the data transmission efficiency.

While the invention has been shown and described with reference to certain exemplary embodiment thereof, various changes in form and detail may be therein without departing from the spirit and scope of the as defined by the appended claims and their equivalents.

What is claimed is:

1. A method for transmitting an Automatic Repeat reQuest (ARQ) block in a transmitter of a wireless communication system, the method comprising:
  preparing for the ARQ block retransmission;
  determining whether to retransmit the ARQ block without rearrangement or to retransmit the ARQ block with rearrangement;
  if determined to retransmit the ARQ block with rearrangement,
  fragmenting the ARQ block into ARQ sub-blocks, each of which is assigned to a sub-block sequence number sequentially,
  retransmitting the ARQ sub-blocks,
  waiting for ARQ feedback of the ARQ block or of all ARQ sub-blocks of the ARQ block, and if a positive acknowledgement arrives regarding the ARQ block, transitioning to a done state.

2. The method of claim 1, further comprising:
in a not-sent state, transmitting the ARQ block, and transitioning to an outstanding state to wait to receive ARQ feedback for the ARQ block;
if the ARQ block is re-transmitted without rearrangement, transitioning to the outstanding state; and
in the outstanding state, if negative acknowledgements arrives regarding the ARQ block, transitioning to the waiting-for-retransmission state.

3. The method of claim 1, further comprising:
if ARQ sub-block is negatively acknowledged, retransmitting the corresponding ARQ sub-block; and
if a predefined time period for the ARQ block expires, transitioning to a discard state.

4. The method of claim 1, wherein the ARQ block is retransmitted in a rearrangement state which includes an ARQ sub-block state comprising a non-sent state, an outstanding state, a waiting-for-retransmission state and a done state.

5. The method of claim 4, wherein the non-sent state of the ARQ sub-block state comprises:
fragmenting the ARQ block into ARQ sub-blocks, each of the ARQ sub-blocks being sequentially assigned a sub-block sequence number;
retransmitting the ARQ sub-blocks; and
when the ARQ sub-blocks are retransmitted, transitioning to the outstanding state of the ARQ sub-block state.

6. The method of claim 4, wherein the outstanding state of the ARQ sub-block state comprises:
waiting for an acknowledgement of the ARQ sub-blocks;
if a positive acknowledgement arrives regarding the ARQ sub-blocks, transitioning to the done state of the ARQ sub-block state; and
if the ARQ sub-blocks are negatively acknowledged, transitioning to the waiting-for-retransmission state of the ARQ sub-block state.

7. The method of claim 4, wherein the waiting-for-retransmission state of the ARQ sub-block state comprises:
preparing for the ARQ sub-blocks retransmission;
if the ARQ sub-blocks are retransmitted, transitioning to the outstanding state of the ARQ sub-block state; and
if a positive acknowledgement arrives regarding the ARQ sub-blocks, transitioning to the done state of the ARQ sub-block state.

8. An apparatus for transmitting an Automatic Repeat reQuest (ARQ) block in a wireless communication system, the apparatus comprising:
a controller,
wherein the controller is configured to determine whether to retransmit the ARQ block without rearrangement or to retransmit the ARQ block with rearrangement and to prepare for the ARQ block retransmission;
wherein, if determined to retransmit the ARQ block with rearrangement,
the controller is configured to fragment the ARQ block into ARQ sub-blocks, each of which is assigned to a sub-block sequence number sequentially,
configured to retransmit the ARQ sub-blocks,
configured to wait for ARQ feedback of the ARQ block or of all ARQ sub-blocks of the ARQ block, and
if a positive acknowledgement arrives regarding the ARQ block, to transition to a done state.

9. The apparatus of claim 8, wherein the controller is further configured to:
in a not-sent state, transmit the ARQ block, and transition to an outstanding state to wait to receive ARQ feedback for the ARQ block;
if the ARQ block is re-transmitted without rearrangement, transition to the outstanding state; and
in the outstanding state, if a negative acknowledgement arrives regarding the ARQ block, transition to the waiting-for-retransmission state.

10. The apparatus of claim 8, wherein the controller is further configured to:
if ARQ sub-block is negatively acknowledged, retransmit the corresponding ARQ sub-block; and
if a predefined time period for the ARQ block expires, transition to a discard state.

11. The apparatus of claim 8, wherein the ARQ block is retransmitted in a rearrangement state which includes an ARQ sub-block state comprising a non-sent state, an outstanding state, a waiting-for-retransmission state and a done state.

12. The apparatus of claim 11, wherein in the non-sent state of the ARQ sub-block state, the controller is further configured to:
fragment the ARQ block into ARQ sub-blocks, each of the ARQ sub-blocks being sequentially assigned a sub-block sequence number;
retransmit the ARQ sub-blocks; and
when the ARQ sub-blocks are retransmitted, transition to the outstanding state of the ARQ sub-block state.

13. The apparatus of claim 11, wherein in the outstanding state of the ARQ sub-block state, the controller is further configured to:
wait for an acknowledgement of the ARQ sub-blocks;
if a positive acknowledgement arrives regarding the ARQ sub-blocks, transition to the done state of the ARQ sub-block state; and
if the ARQ sub-blocks are negatively acknowledged, transition to the waiting-for-retransmission state of the ARQ sub-block state.

14. The apparatus of claim 11, wherein in the waiting-for-retransmission state of the ARQ sub-block state, the controller is further configured to:
prepare for the ARQ sub-blocks retransmission;
if the ARQ sub-blocks are retransmitted, transition to the outstanding state of the ARQ sub-block state; and
if a positive acknowledgement arrives regarding the ARQ sub-blocks, transition to the done state of the ARQ sub-block state.

* * * * *